Oct. 4, 1966  D. C. MEYERS  3,277,456
SEQUENTIAL TRANSMISSION OF RANDOMLY OCCURRING EVENTS
Filed March 9, 1962
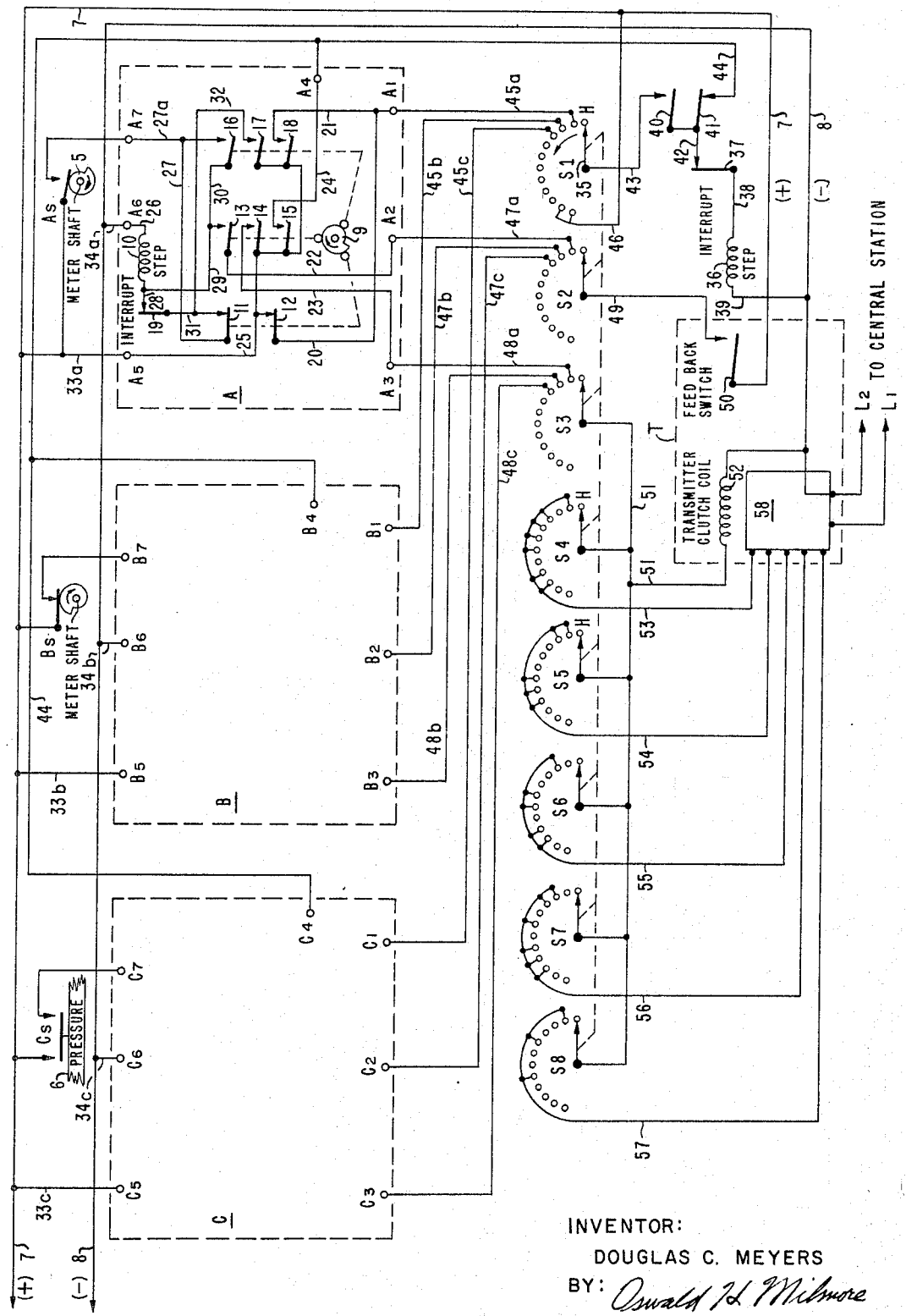
INVENTOR:
DOUGLAS C. MEYERS
BY: Oswald H. Milmore
HIS ATTORNEY

United States Patent Office 3,277,456
Patented Oct. 4, 1966

3,277,456
SEQUENTIAL TRANSMISSION OF RANDOMLY
OCCURRING EVENTS
Douglas C. Meyers, Metairie, La., assignor to Shell Oil
Company, New York, N.Y., a corporation of Delaware
Filed Mar. 9, 1962, Ser. No. 178,643
2 Claims. (Cl. 340—213)

The invention relates to the sequential transmission of a series of signals which indicate a plurality of randomly occurring events. The invention is useful, for example, for monitoring occurrences, such as the closures of switches associated with operating and measuring equipment at a remote location or locations.

For example, it is often desired to monitor events at unattended peroleum production facilities by transmitting to a central station a series of signals indicative of such events as the opening or closing of a controller, e.g., a valve, the attainment of an abnormal condition, e.g., excessive or sub-standard temperature, pressure or flow-rate or the occurrence of a fire.

When used to transmit well test data, the flow of each unit of well fluid, e.g., of oil, gas and water, through a meter is an event. Variable data, such as pressure and temperature, can also be transmitted, e.g., by converting the measured quantity to a frequency and transmitting pulses at that frequency. Such transmissions are usually made over single wire or radio channels which are in some instances also used for interrogating the facilities, as to determine whether a particular event has occurred.

Sequential transmission according to the invention is useful also in such apparatus as multiple-channel recorders. In such applications the data from each source can be recorded, for example, by punching holes in several channels of tape by a punching machine (also known as a motorized punch) having a code solenoid for each channel. In this instance each code solenoid has a separate input circuit.

In general, such events are, at the source, indicated by the condition of a bi-stable circuit-control device, such as an electric switch. In the instant specification the condition of such device which causes a signal to be transmitted is called its on-condition. It is evident that when it is embodied as a switch, the open and closed positions of the switch may correspond, respectively, to the off- and on-conditions of said device; however, the converse relation may be used.

Whenever there are more than one of such bi-stable circuit-control devices connected to a single receiver, be it by a single transmission channel to a receiver or over multiple, individual channels to a recording device, there is danger of error and confusion from two causes: When two of such devices change into the on-condition simultaneously or in such close succession that transmission of a signal for the first is not completed when the second device changes to the on-condition there is a possibility of confusion. For example, when the signals are coded electrical pulses, for identifying the device, there could be simultaneously or overlapping transmission of pulses over the same channel, resulting in an unintelligible signal at the receiving station; and when such events are transmitted in close succession over separate channels to corresponding code solenoids of a recorder, the later pulse may arrive too late to be effective to make a record, viz, to cause a hole to be punched. The second cause of error is the danger of recording events repetitively, as when the bi-stable device remains in its first position for a period longer than that required to transmit a signal. One solution to this difficulty, applicable only to multi-channel transmissions, is described in applicant's U.S. Patent No. 2,961,286 of November 22, 1960.

It is the object of this invention to avoid the foregoing difficulties by effecting sequential transmission of the signals from the several bi-stable devices.

It is a further object to provide an apparatus for scanning the several bi-stable devices to test their condition in succession whenever any one of them is in the on-condition, and to interpose a memory unit between each of said devices and the scanning means for insuring the transmission of a signal despite return of a device to its off-condition before it is reached by the scanning device. Ancillary thereto, it is an object to construct the memory unit so that not more than one signal for each change in the associated bi-stable device to the on-condition will be transmitted even though said device remains in its on-condition after completion of a transmission.

A further object is to provide a system for the sequential transmission of signals indicative of the conditions of a plurality of bi-stable devices, wherein said signals are in the form of codes which identify the respective bi-stable devices.

Further objects will appear from the following description.

In summary, the invention uses a scanner, such as a multi-position stepping switch, having a home position and a separate position for each bi-stable device which are normally in their off-condition and means for actuating the scanner to test said devices in succession whenever any of them assumes an on-condition, means for stopping the scanning action after all bi-stable devices have been tested, and means for transmitting a signal whenever said scanner tests a bi-stable device which is in its on-condition.

When used at a remote location to transmit the said signal over a wire or radio channel to a central station, the bi-stable device may be identified in any of several ways. In one embodiment, the scanner is connected to select a code pattern which is transmitted as a pattern of sequential electrical pulses and the central station includes a decoding device for idenifying the bi-stable device which was responsible for initiating the signal transmission. On the other hand, there may be, at the central station, a receiving scanner, such as another stepping switch, which is stepped in synchronism with the scanner at the remote station and direct the transmitted signal over that one of several output circuits which corresponds to the bi-stable device which initiated the transmission.

To avoid the loss of a signal, e.g., when the time period during which a bi-stable device is in its on-position is so short that it returns to its off-condition before it is tested by the scanner, there is preferably a memory unit inerconnected beween each said bi-stable device and the scanner, said memory unit, for example, consisting of one or more latching relays or a stepping switch for continuing to indicate an on-condition of the bi-stable device after the return of the latter to off-condition until a signal has been transmitted. Moreover, to avoid the transmission of more than one signal for each transition of the bi-stable device from the off-condition to the on-condition, the said memory unit preferably has three positions, respectively, an off-condition, an on-position, and a third or "passed" position, and is connected to the scanner to indicate an on-condition of the bi-stable device only when the memory unit is in its on-position; this unit is then constructed (1) to occupy normally its off-position, (2) to move to its on-position only from its off-position and only when the associated bi-stable device is in or changes to the on-condition, (3) to move to its third position only from its on-position and only upon the transmission of a signal for the associated bi-stable device, and (4) to move to the off-position only from its third position and only when the associated bi-stable device is in or returns to its off-condition.

Having indicated the nature of the invention in general terms, reference is made to drawings forming a part of this specification, the single view of which shows diagrammatically a preferred embodiment comprising a plurality of bi-stable circuit-control devices and a scanner according to the invention suitable for installation at a remote station.

Referring to FIGURE 1, A$s$, B$s$ and C$s$ represent bi-stable devices, represented by switches which, when closed, are in their on-conditions and are normally in open or off-conditions. For the sake of simplicity only three such devices are shown. A$s$ and B$s$ are shown to be actuated by cams 5 operated by the output shafts of meters, so as to close the switches once each revolution, indicating the flow of a unit of fluid. C$s$ is shown to be actuated by a pressure-sensitive device 6 to close the switch when an abnormal pressure prevails. 7 and 8 represent power circuits, e.g., D.C., and each of said devices is connected between the circuit 7 and a terminal, e.g., A7, B7 or C7 of a corresponding memory device A, B or C. These units being of like construction, only the first is shown in detail.

The memory unit, in this embodiment, comprises a three-position stepping switch having three sets of contacts of which one set is closed and the other two open. The switch is represented as being driven by a cam 9 which is advanced once stepwise by a pawl driven by a step coil 10 and a spring, connected so that energization of the coil 10 advances the pawl and de-energization permits the spring to retract the pawl to move the cam. The invention being not restricted to any specific form of stepping switch and such switches being well known, the pawl and spring and other details are not shown. It may be noted that the switch is shown in its first or off-position, with the switches 11 and 12 closed and switches 13–18 open; the next cam movement moves the switch to its second or on-position, opening switches 11–12 and closing switches 13–15; a second cam movement moves the switch to its third or passed position, opening the switches 13–15 and closing the switches 16–18; a third cam movement advances the switch to its first position. The switch further has a normally closed interruptor switch 19 which is opened by the pawl whenever the coil 10 is energized.

The memory unit has seven external circuits, connected to terminals A1–A7, inclusive. The internal connections are as follows: Terminal A1 is connected to the armature of switch 12 and the make-contact of switch 18 by circuits 20 and 21; A2 to the armature of switch 13 by a circuit 22; A3 to the make-contact of switch 14 by a circuit 23; A4 to the make-contact of switch 15 by a circuit 24; A5 to the make-contact of switch 12 and the armatures of switches 14, 15, 17 and 18 by a circuit 25; A6 to one terminal of the stepping coil by a circuit 26; and A7 to the armature of switch 11 and the make-contact of switch 16 by circuits 27 and 27a. The other terminal of the coil 10 is connected to the make-contacts of the interruptor switch 19 and of the switch 13 by circuits 28 and 29 and to the armature of switch 16 by a circuit 30. The armature of the switch 19 is connected to the make-contact of the switch 11 by a circuit 31 and, optionally, by a circuit 32 to the make-contact of the switch 17. However, the switch 17 and circuit 32 may be omitted whenever the dwell of the cam 5 is long enough to obviate the danger of opening of the switch A$s$ before a complete scanning operation.

The terminals A5, B5, C7, etc., of the memory units are connected by an external circuit 33a, 33b or 33c to the power circuit 7 and the terminals A6, B6, C6, etc., by circuits 34a, 34b or 34c to the power circuit 8.

S1–S8 are eight decks of a stepping switch, each section having a wiper arm 35 and a plurality of contacts, arranged so that all eight arms move in unison. In each deck there is a contact H at the home position and at least one additional contact for each associated memory unit A, B, etc. The switch is of the type which rotates in one direction, so that the wipers reach home position when advanced one step beyond the last position. The sections S1, S2 and S3 are used in cooperation with the memory units and constitute the scanning device, and the other five sections (which may include more or less than five sections) constitute a code generator, which cooperate to a code transmitter T. The stepping switch has a pawl and spring (not shown) for advancing the wipers step by step, the pawl being advanced when a stepping coil 36 is energized and the wiper arms being advanced by retraction of the pawl due to the spring when this coil is de-energized. The details of such stepping switches being well known, they are not presented herein. It is evident that the invention is not limited to this specific type of stepping switch as the scanning device, nor to the use of certain decks of the same stepping switch for the code-generating device.

The stepping switch has a normally closed interruptor switch 37 the armature of which is connected by a circuit 38 to one terminal of the coil 36, the other terminal of the latter being connected by a circuit 39 to the power circuit 8. The interruptor switch 37 is opened by the pawl whenever the coil 36 is energized. The switch further has a pair of off-normal switches 40 and 41 which are usually cam-actuated to be respectively open and closed when the wipers are at home position, but to move to closed and open positions when the wipers are in any other position. The armatures of these switches are connected by a circuit 42 to the make-contact of the interruptor switch, the make-contact of switch 40 is connected by a circuit 43 to the wiper 35 of the section S1 and the make-contact of the switch 41 is connected by a common circuit 44 to the terminals A4, B4, C4, etc., of the memory units.

The contacts beyond home position of section S1 are connected respectively to the terminals A1, B1, C1, etc., of the memory units by circuits 45a, 45b, 45c, it being understood that the contacts shown without circuits are to be connected to additional, similar units. When the number of available contacts exceeds the number of memory units used, e.g., as in the case of the last two contacts, they are connected to the power circuit 7 by a common circuit 46.

The contacts of section S2 are similarly connected by circuits 47a, 47b, 47c, etc., to the terminals A2, B2, C2, etc., while those of section S3 are connected by circuits 48a, 48b, 48c, etc., to the terminals A3, B3, C3, etc., of the memory units. The wiper of section S2 is connected by a circuit 49 to one side of a normally open feed-back switch 50 in the transmitter, the other side of which is connected to the circuit 7. The feed-back switch is closed momentarily by a cam in the transmitter at the completion of a transmission.

The wipers of the sections S3–S8 are connected by a common circuit 51 to the clutch coil 52 in the transmitter by which a transmission is initiated, the other side of this coil being connected to the circuit 8. The contacts of the section S4–S8 corresponding to the memory units are interconnected to code circuits 53–57 by a number of connections which will produce a different combination or code of connections for each switch position. Thus, in the example shown, when the wipers are in the first position beyond the H position, the contacts of the sections S4, S5, and S8 are active; and when in the second position, the contacts of S5, S6 and S7 are active. It is thereby possible to select a different code for each meter or alarm signal to be transmitted (as represented by the switches A$s$, B$s$, C$s$, etc.) by positioning the wipers to a corresponding position. The circuits 53–57 extend to a scanning unit 58 of the transmitter which is not herein further described because it is well known per se. (An example of commercially available transmitter is the Tele-type Model 28 Type LD Transmitter-Distributor with auxiliary feed-back contact.) The transmitter has a continuously-running electric motor which is connected to a scanning mechanism by a magnetic single-revolution clutch which is normally disengaged. When the circuit 51 is energized (via the section S3, as will appear) the clutch coil 52 engages the single-revolution clutch to transmit over the line $L_1$-$L_2$ first a synchronizing pulse and thereafter to scan the circuits 53–57 in succession. For example, the line $L_2$ may be connected to the circuit 8 and the line $L_1$ connected in succession to each of the circuits 53–57. At the end of the cycle the feed-back switch 50 is closed and opened.

*Operation*

The switches A*s*, B*s*, C*s*, etc., are normally open, the memory units are in their first ("off") positions as shown for unit A, and the stepping switch S1–S8 is in home position. Voltage is thereby applied to all contacts of the scanning switch section S1 via circuits 45a, 45b, etc., or 46 and, within each memory via circuit 20, switch 12, and circuit 25. When any one or more of the first-mentioned switches closes, power from the circuit 7 is impressed on the stepping coil 10 via the terminal A7 (or B7, C7, etc., of the associated memory unit), circuit 27, switch 11, circuit 31, interruptor switch 19 and circuit 28. This advances the stepping pawl and opens the interruptor switch, permitting the pawl to retract and advance the cam 9 to move the three-position switch to its second or "on" position, opening switches 11 and 12 and closing switches 13–15. This removes the voltage from the corresponding contact of section S1 and the interruptor switch 19 to prevent continued advancement of the cam 9; it also connects the stepping coil 10 to the corresponding contact of S2 via switch 13 and circuit 22, applies power via circuit 25, switch 14 and circuit 23 to the corresponding contact of S3, and applies power via circuit 25, switch 15, circuits 24 and 44, switch 41, circuit 42, switch 37 and circuit 38 to the stepping coil 36 to initiate movement of the switch. When this coil is energized its pawl advances, opening the interruptor switch 37, whereupon the pawl spring causes the pawl to retract to advance the wipers to first positions and shifting the off-normal switches 40 and 41. The interruptor switch 37 closes again at the completion of this step.

After the first step, and until attaining home position at the end of the scanning cycle, the interruptor switch receives power only via the switch 40, circuit 43 and the wiper arm 35. Whenever this arm comes to rest on a contact which is energized the stepping coil 36 is again energized, the switch 37 is opened, and the wipers advance an additional step. This continues until the wiper arm reaches a contact which is not energized, viz., one corresponding to a memory unit in its on-position, e.g., the first contact in the example under discussion. It may be noted that opening of the switch A*s* after the memory unit A is in on-position has no effect on the position of this unit; and that there may be a plurality of memory units in their on-position, e.g., as when the switch C*s* closes simultaneously with switch A*s* or at any after it but before the wiper arms have reached the third contact.

While the stepping switch is scanning the memory units the wiper of section S3 passes non-energized contacts until the switch comes to rest as explained above. In this position the circuit 51 is energized from the wiper of section S3 to energize the clutch coil 52 and engage the single-revolution clutch in the transmitter. This transmits through the lines $L_1$ and $L_2$ first a synchronizing pulse and then a code corresponding to that selected on the sections S4–S8. Thus, when the unit A indicates the on-condition of the device A*s*, the code is: Sync, P–P–*b*–*b*–P, wherein "Sync" represents the synchronizing pulse, "P" a voltage pulse, and "*b*" no-pulse, each pulse or no-pulse occurring at predetermined time intervals. At the completion of the transmission the feed-back switch 50 is closed momentarily to apply a voltage via the circuit 49, section S2, circuit 22, switch 13 and circuit 29 to stepping coil 10. When switch 50 again opens this voltage is removed and the memory unit is advanced to its third or passed position. This opens the switches 13–15, thereby de-energizing the terminals A3 and A4; the circuit 44 is therefore energized only in the event that another memory unit is in its on-position. Also, the coil 10 is disconnected from the section S2.

When the memory unit is in its third position power is again applied to the corresponding contact of section S1 via circuit 21 and switch 18, causing the stepping coil 36 to be energized and causing the scanning switch to continue its advance. Upon reaching another contact of section S1 which is de-energized, it stops and the operations of the preceding two paragraphs are repeated. When no de-energized contact is encountered the scanning switch continues until reaching home position, where it comes to rest, provided that the circuit 44 is then de-energized. However, if any memory unit moved to its on-position since it was reached in the scanning operation, the switch continues to scan until a corresponding signal is transmitted. During such a repetitive scanning, it will not come to rest at positions corresponding to devices which have not completed a further cycle of operation. For example, when scanning a second time because the circuit 44 is energized, if the switch A*s* is still closed, its memory unit A will be in its third or passed position, and the circuit 45a energized; the switch will, therefore, not stop at its first position to transmit a second signal indicative of the device A*s*. It is evident that in this manner one and only one signal will be transmitted for each closure of the switch A*s*.

When the memory unit moves to its third position, the coil 10 is energized through circuits 29 and 30, switch 16, circuit 27a, and switch A*s*. It remains energized so long as switch A*s* remains closed. It returns to first position only when the coil is de-energized by opening of the switch A*s*.

In those installations where the switch A*s* closes for such a short period that it may be open when the memory unit attains its third position, it is desirable to provide the optional circuit 32 and switch 17. When such a situation arises, this circuit applies power to the coil 10 via the interruptor switch 19 and circuit 28. If the switch A*s* is then open, opening of the interruptor causes immediate movement to the first position. However, should the switch A*s* be still closed, the coil 10 remains energized as explained in the preceding paragraph.

The lines $L_1$ and $L_2$ are connected to any suitable receiver at the central station. Because many types of receivers suitable for the purpose are known and because the invention is not restricted to any specific type, it is not described herein in detail. It may be noted, however, that when used with a code-generator of the type described, such a receiver is usually of the type which initiates a timing cycle when the synchronizing pulse is transmitted, and then connected the lines sequentially—either by physical or electronic switching, e.g., by stepping or cam-operated switches or by vacuum tubes, transistors or the like—to test elements which set up a controller device determined by the transmitted code. A specific example of a commercially available receiver is a Teletype Model 28 sequential Selector (600/min.) and a Teletype Model 28 Stunt Box connected thereto.

I claim as my invention:

1. Apparatus for transmitting signals indicative of the conditions of each of a group of independently operable bistable circuit control devices having off- and on-conditions, which comprises:
   (a) a multi-position scanner for testing in succession the conditions of said devices;
   (b) means for actuating said scanner to test said devices in succession whenever any of said devices assumes said on-condition;
   (c) a memory unit having a normal off-position, an on-position and a third position, means for changing the memory unit to the on-position only from said off-position when the associated bistable device assumes the on-condition thereof;

(d) means for changing the memory unit to the third position only from the on-position upon the completion of transmission of a signal corresponding to the on-condition of said associated bistable device; and
(e) means for changing the memory unit to the off-position only from said third position when said associated bistable device is in said off-condition;
(f) said scanner being sequentially responsive to the positions of said memory units to sense on-condition for each bistable device when and only when the associated memory unit is in said on-position.

2. Apparatus as defined in claim 1 wherein said memory unit is a stepping switch.

References Cited by the Examiner

UNITED STATES PATENTS

| | | | |
|---|---|---|---|
| 2,504,999 | 4/1950 | McWhirter et al. | |
| 2,799,846 | 7/1957 | Negrin et al. | 340—213 |
| 2,840,705 | 6/1958 | Scully | 340—147 |
| 2,937,369 | 5/1960 | Newbold et al. | 340—177 |
| 2,942,244 | 6/1960 | Larson | 340—182 |
| 3,029,414 | 4/1962 | Schrimpf | 340—147 |
| 3,189,882 | 6/1965 | Ward | 340—213 |

NEIL C. READ, *Primary Examiner.*

L. A. HOFFMAN, P. XIARHOS, *Assistant Examiners.*